Patented Apr. 18, 1944

2,346,928

UNITED STATES PATENT OFFICE 2,346,928

COMPOSITION FOR DESTROYING FOAM AND FROTH

Charles H. Lighthipe, Bloomfield, N. J., assignor to National Oil Products Company, Harrison, N. J., a corporation of New Jersey No Drawing. Application May 29, 1940, Serial No. 337,822

19 Claims. (Cl. 106—131)

The invention relates in general to defoaming and in particular to defoaming agents adapted for use in glues, adhesives, sizings, paper stock, etc., and to correlated improvements in compositions containing such defoaming agents.

It is well known that many substances inherently or otherwise possess the tendency to foam or froth when subjected to heat, agitation or the like whether such operations are carried on during the manufacture, processing or use of such substances. This undesirable property which is particularly troublesome in solutions, pastes or slurries of a colloidal nature, necessitates costly delays in producing and/or using such substances. Moreover, such foaming or frothing directly affects the quality of the products produced from the use of such substances. In the manufacture of bone or hide glues, for example, foaming presents a serious problem both in the preparation and use thereof. Frothing or foaming in paper making operations is another specific illustration wherein this problem is a serious one. While various defoamers have been proposed in an attempt to abate or prevent the production of foam or froth as well as to destroy existing foam or froth, the ever present demand exists for agents having improved and more efficient defoaming properties.

The general object of the invention is to obviate the foregoing and other disadvantages.

Another object of the invention is to provide a defoaming agent having improved and more efficient defoaming action.

A further object of the invention is to provide an improved foam or froth killer.

A specific object of the invention is to provide an improved defoaming agent for animal glues.

A further object of the invention is to provide an improved animal glue which is characterized by being substantially resistant to foaming during normal use thereof.

Other objects of the invention will in part be obvious and will in part appear hereinafter.

According to the invention there is provided an improved defoaming agent comprising a partial ester of a polyhydric alcohol with a higher fatty acid containing at least one hydroxyl group with which there may or may not be blended oils, waxes, emulsifiers or other desirable materials. The expression "partial ester" is used herein to connote an ester of a polyhydric alcohol in which at least one of the hydroxyl groups remains free or unesterified. The invention further contemplates an improved adhesive comprising an animal glue and the aforementioned defoaming agent.

The invention accordingly comprises a composition of matter possessing the characteristics, properties and the relation of components which will be exemplified in the composition hereinafter described and the scope of the invention will be indicated in the claims.

The defoaming agent of the invention may comprise any suitable partial ester of a polyhydric alcohol with a higher fatty acid containing at least one hydroxyl group. In the preparation of such partial esters a suitable polyhydric alcohol is combined with a suitable hydroxy fatty acid, the quantity of the latter being less than that required to completely esterify all the hydroxyl groups in the alcohol. The esterification may be effected according to any known process as, for example, by heating the alcohol-acid mixture to about 200° C. or higher to split out water and form the ester. Likewise, the partial ester may be produced by reacting in the presence of an alkaline substance such as pearl ash, caustic soda, caustic potash or the like, a hydroxy triglyceride and glycerol or other polyhydric alcohol in a known manner. Irrespective of the process used in the preparation of the partial ester, the important factor resides in obtaining an ester wherein the alcoholic portion as well as the fatty portion each contain at least one hydroxyl group.

In the production of the partial ester any suitable polyhydric alcohol may be used including, inter alia, glycerol, polyglycerols, glycol, ethylene glycol, diethylene glycol, triethylene glycol, propylene glycol, sorbitol, mannitol, etc. Likewise any suitable hydroxy fatty acid may be used including, among others, mono, di or trihydroxy stearic acid, ricinoleic acid, hydrogenated ricinoleic acid, hydroxylated fish oil fatty acids, hydroxylated cottonseed fatty acids, hydroxylated neat's-foot fatty acids or any other suitable hydroxylated fatty acids. In the preparation of the hydroxylated fatty acids, any suitable and known process may be employed of which there are several. For example, an unsaturated fatty acid may be sulfated and the resulting sulfate hydrolyzed by means of an aqueous solution of a mineral acid or a fatty acid may be halogenated and subsequently hydrolyzed by means of an alkali. Other methods of hydroxylation include direct treatment of a fatty acid with a peroxide or hypochlorous acid.

While any of the foregoing or other partial esters fall within the purview of my invention, it is highly preferred to employ the partial glycerol esters of hydroxy fatty acids. These esters are better known as mono and diglycerides of the higher fatty acids. In this preferred class of partial esters the following are representative: glyceryl monohydroxy stearate, glyceryl monoricinoleate, glyceryl dihydroxy stearate, glyceryl diricinoleate and the mono and diglycerides of the higher hydroxy fatty acids.

While the foregoing type esters inherently possess defoaming properties and may be used separately or in combination with each other as defoamers, it is preferable to use the same in combination with other substances which, when properly blended, enhance the defoaming properties of the agent as a whole. Such substances include, inter alia, animal and vegetable oils, fats or waxes, such a teaseed oil, olive oil, castor oil, etc., tallow wool grease, etc., sperm oil (wax), montan wax, candelilla wax, etc., as well as derivatives of these and other fatty substances, such as the higher fatty acids, polyvalent metal soaps of fatty acids, fatty alcohols, fatty amides, fatty amines, etc., and/or mineral oils and waxes, such as paraffin oil, paraffin wax, scale wax, petrolatum, etc.

It has been found that the partial esters, apart from their inherent defoaming properties, serve as excellent blending agents for and between the oily and waxy substances aforementioned and the material to be defoamed or foam to be destroyed. Such blending greatly enhances the defoaming action of the oily and waxy substances after incorporation thereof into the material to be defoamed, according to the invention, such as bone or hide glues, dextrine or starch pastes and other animal or vegetable adhesives, sizes, coating compositions, etc., as well as paper stock, alcohol fermentation masses obtained in the manufacture of gin and other spirituous liquors. The defoamer may also be used to advantage in yeast manufacture, in the manufacture of sugar, and in the evaporating steps in the production of evaporated and condensed milk, etc.

The preferred type of defoaming agent of the invention comprises a partial glycerol ester of a hydroxy higher fatty acid, a fatty substance such as an animal or vegetable oil or fat and an oily or waxy mineral substance such as scale wax or paraffin. The proportion of partial ester used in the defoaming agent may be varied within wide limits depending upon its specific application and depending further on the type ingredients included therein. In a composition comprising water, paraffin wax, an animal or vegetable oil or fat and a partial glycerol ester of a hydroxy fatty acid; the latter may constitute 2% to 50%, based on the weight of the composition. In the event that an emulsifying agent such as a sulfonated animal or vegetable oil or fat is included, the quantity of partial ester used may be decreased. The various constituents of the defoaming agent may be varied to suit the conditions at hand and in most cases the agent should be adapted to be dispersed in an aqueous medium.

In preparing an animal glue, such as bone or hide glue, an aqueous dispersion of a defoamer of the invention comprising, for example, water, paraffin wax, a vegetable oil such as castor oil and a partial ester such as glycerol monohydroxy stearate may be added to an aqueous solution or colloidal mixture of the glue in an amount of about .25% to 3% based on the dry weight of the glue. Such a glue product is substantially free from foaming or frothing during normal use. Moreover, the oily and waxy substances further function as plasticizers in the dried product, thus further enhancing the value of such defoamers. Another defoamer of the invention particularly suitable for glue comprises tallow, a water-soluble soap, sulphonated tallow and glyceryl monohydroxy stearate. Still another example comprises scale wax, candelilla wax, an alkali metal soap of stearic acid and glyceryl monohydroxy stearate. The candelilla wax in the foregoing example may be substituted with a polyvalent metal soap, such, for example, as aluminum stearate, zinc stearate or the like. In all the defoamers of the invention, it is highly preferred to provide therein an appreciable quantity of water of about 15% to 75%. As hereinbefore stated, a suitable defoamer of the invention may consist of a partial glyceryl ester of a hydroxy fatty acid such as glyceryl mono-hydroxy stearate or the like and water. From the foregoing examples it is apparent that many combinations of ingredients are available according to the invention, the salient feature being, of course, the aforementioned partial ester. As to the preparation of the defoamer of the invention, the several components may be admixed in any suitable order to produce a smooth paste or emulsion.

It is to be understood that the defoaming agent of the invention may also be used as a foam killer, i. e., used to destroy foam or froth after it has been produced. In the use of treatment of substances, such as vegetable adhesives, paper coatings or sizes or the like, for example, foam or froth is usually developed and more satisfactory results are obtained if the agent is added after or during such foaming or frothing, whereby the foam or froth is destroyed. The expression "defoamer" is used generically herein to connote an agent which will prevent the formation of foam or froth and also an agent which will destroy existing foam or froth.

Since certain changes may be made in the above composition of matter and different embodiments of the invention could be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention, which, as a matter of language, might be said to fall therebetween; in that if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

Having described my invention, what I claim as new and desire to secure by Letters Patent is:

1. A process of abating the formation of foam in foamable materials comprising adding to such materials an agent comprising a partial ester of a polyhydric alcohol with a higher hydroxy fatty acid blended with a hydrophobic substance selected from the class consisting of animal and vegetable oils, fats and waxes and mineral oils and waxes.

2. A process of abating the formation of foam in foamable materials comprising adding to such materials an agent comprising a partial glyceryl ester of a higher hydroxy fatty acid blended with a hydrophobic substance selected from the class consisting of animal and vegetable oils, fats and waxes and mineral oils and waxes.

3. A process of abating the formation of foam in foamable materials comprising adding to such materials an agent comprising glyceryl mono-hydroxy stearate blended with a hydrophobic substance selected from the class consisting of animal and vegetable oils, fats and waxes and mineral oils and waxes.

4. A process of abating the formation of foam in foamable materials comprising adding to such materials an agent comprising glyceryl mono-ricinoleate blended with a hydrophobic substance selected from the class consisting of animal and vegetable oils, fats and waxes and mineral oils and waxes.

5. A process of abating the formation of foam in foamable materials comprising adding to such materials an agent comprising a homogeneous blended mixture of a partial glyceryl ester of a higher hydroxy fatty acid, a hydrophobic substance selected from the class consisting of animal and vegetable oils, fats and waxes and mineral oils and waxes and a hydrophilic substance selected from the class consisting of saponified and sulfonated animal and vegetable oils, fats and waxes.

6. A process of abating the formation of foam in foamable materials comprising adding to such materials an agent comprising a homogeneous blended mixture of glyceryl mono-hydroxy stearate, a hydrophobic substance selected from the class consisting of animal and vegetable oils, fats and waxes and mineral oils and waxes and a hydrophilic substance selected from the class consisting of saponified and sulfonated animal and vegetable oils, fats and waxes.

7. A process of abating the formation of foam in foamable materials comprising adding to such materials an agent comprising a homogeneous blended mixture of a partial glyceryl ester of a higher hydroxy fatty acid, a vegetable oil and a wax.

8. A process of abating the formation of foam in foamable materials comprising adding to such materials an agent comprising a homogeneous blended mixture of a partial glyceryl ester of a higher hydroxy fatty acid, a water-soluble soap and a wax.

9. A process of abating the formation of foam in foamable materials comprising adding to such materials an agent comprising a homogeneous blended mixture of glyceryl mono-hydroxy stearate, castor oil and a mineral wax.

10. A process of abating the formation of foam in foamable materials comprising adding to such materials an agent comprising a homogeneous blended mixture of glyceryl mono-hydroxy stearate, an alkali metal soap of a higher fatty acid, a mineral wax and a vegetable wax.

11. A process of abating the formation of foam in foamable materials comprising adding to such materials an agent comprising a homogeneous blended mixture of glyceryl mono-hydroxy stearate, tallow, sulfonated tallow and an alkali metal soap of a higher fatty acid.

12. A non-foaming glue containing a foam abating agent comprising glyceryl mono-hydroxy stearate blended with a hydrophobic substance selected from the class consisting of animal and vegetable oils, fats and waxes and mineral oils and waxes.

13. A non-foaming glue containing a foam abating agent comprising a homogeneous blended mixture of glyceryl mono-hydroxy stearate, a hydrophobic substance selected from the class consisting of animal and vegetable oils, fats and waxes and mineral oils and waxes and a hydrophilic substance selected from the class consisting of saponified and sulfonated animal and vegetable oils, fats and waxes.

14. A non-foaming glue containing a foam abating agent comprising a homogeneous blended mixture of glyceryl mono-hydroxy stearate, castor oil and a mineral wax.

15. A non-foaming glue containing a foam abating agent comprising a homogeneous blended mixture of glyceryl mono-hydroxy stearate, an alkali metal soap of a higher fatty acid, a mineral wax and a vegetable wax.

16. A non-foaming glue containing a foam abating agent comprising a homogeneous blended mixture of glyceryl mono-hydroxy stearate, tallow, sulfonated tallow and an alkali metal soap of a higher fatty acid.

17. A process for destroying foam or froth comprising treating the same with an agent comprising a partial ester of a polyhydric alcohol with a higher hydroxy fatty acid blended with a hydrophobic substance selected from the class consisting of animal and vegetable oils, fats and waxes and mineral oils and waxes.

18. A process for destroying foam or froth comprising treating the same with an agent comprising a partial glyceryl ester of a higher hydroxy fatty acid blended with a hydrophobic substance selected from the class consisting of animal and vegetable oils, fats and waxes and mineral oils and waxes.

19. A process for destroying foam or froth comprising treating the same with an agent comprising glyceryl mono-hydroxy stearate blended with a hydrophobic substance selected from the class consisting of animal and vegetable oils, fats and waxes and mineral oils and waxes.

CHARLES H. LIGHTHIPE.